United States Patent
Hsiao et al.

(10) Patent No.: US 6,266,784 B1
(45) Date of Patent: Jul. 24, 2001

(54) DIRECT STORAGE OF RECOVERY PLAN FILE ON REMOTE SERVER FOR DISASTER RECOVERY AND STORAGE MANAGEMENT THEREOF

(75) Inventors: Yu-Mei Una Hsiao; Donald Monson Moxley; Rosa Tesiler Plaza; David Gregory Van Hise, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/153,595

(22) Filed: Sep. 15, 1998

(51) Int. Cl.[7] .................................................. G06F 11/00
(52) U.S. Cl. ........................................ 714/6; 714/5; 714/7
(58) Field of Search ................... 714/6, 5, 7, 8, 714/11, 13, 15, 20, 19

(56) References Cited

U.S. PATENT DOCUMENTS

| | | | |
|---|---|---|---|
| 5,537,533 | 7/1996 | Staheli et al. | 395/182.03 |
| 5,673,382 | 9/1997 | Cannon et al. | 395/182.04 |
| 5,771,343 * | 6/1998 | Hafner et al. | 395/182.02 |
| 5,781,716 * | 7/1998 | Hemphill et al. | 395/182.02 |
| 5,812,748 * | 9/1998 | Ohran et al. | 395/182.02 |
| 5,907,672 * | 5/1999 | Matze et al. | 395/182.06 |
| 6,065,018 * | 5/2000 | Beier et al. | 707/202 |

* cited by examiner

Primary Examiner—Robert Beausoleil
Assistant Examiner—Tim Vo
(74) Attorney, Agent, or Firm—John H. Holcombe; Robert M. Sullivan

(57) ABSTRACT

Disclosed are a method, a storage management system, an article of manufacture comprising a computer readable medium, and a computer program product for saving a recovery plan file for a storage management server. The storage management system has a plurality of storage management servers at sites remote from one another coupled by a server-to-server infrastructure. A recovery plan file is saved for one of the storage management servers at one of the sites by establishing the server as a source for its recovery plan file. Another storage management server at a site remote from the source server site is established as a target for the recovery plan file. The source server transmits the source recovery plan file from the source server to the target server at the remote site over the server-to-server infrastructure. The source recovery plan file is managed at the target server according to defined criteria, for placement, backup, migration and expiration under the control of the source server.

24 Claims, 5 Drawing Sheets

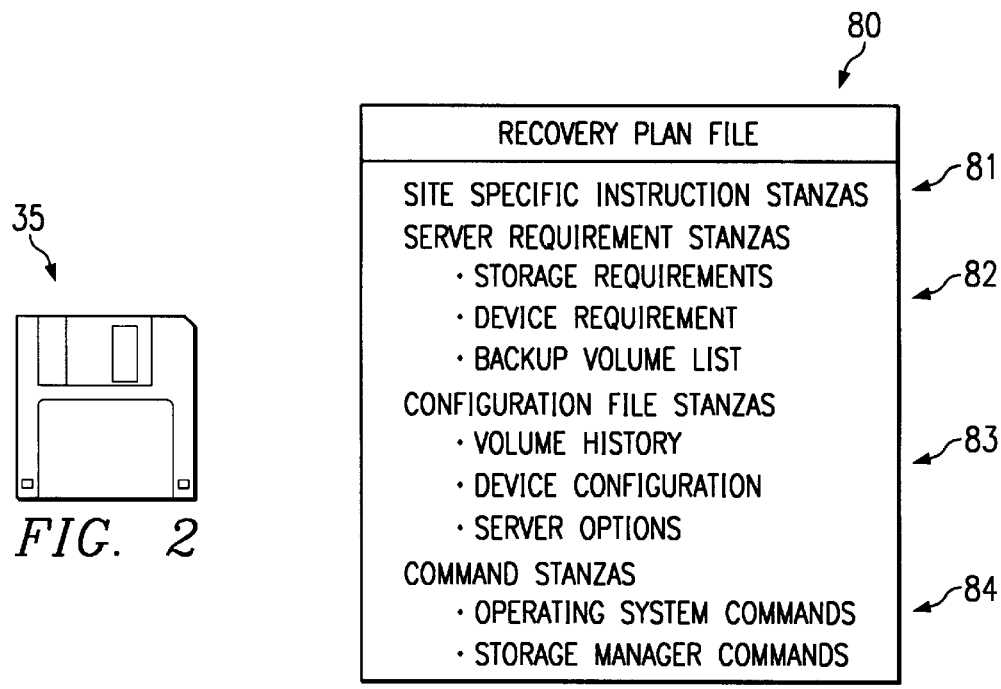
FIG. 2
FIG. 3
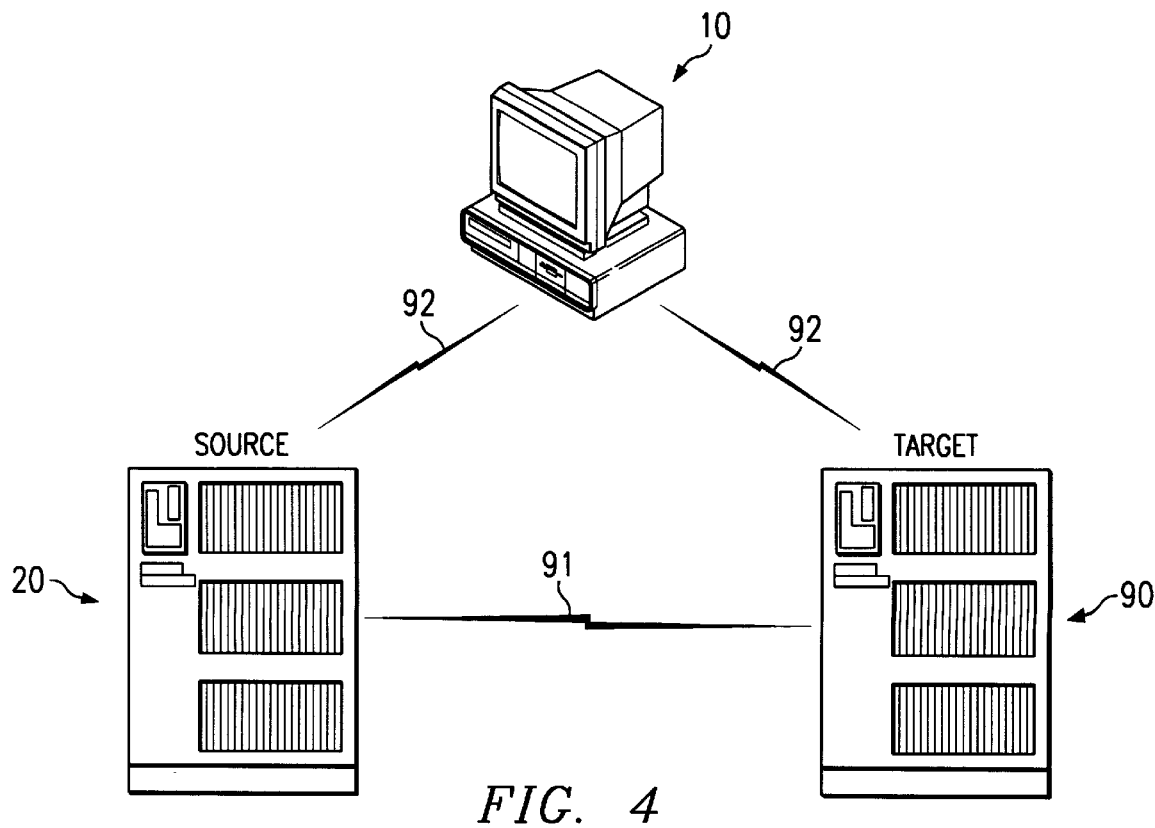
FIG. 4

DIRECT STORAGE OF RECOVERY PLAN FILE ON REMOTE SERVER FOR DISASTER RECOVERY AND STORAGE MANAGEMENT THEREOF

TECHNICAL FIELD

This invention relates generally to disaster recovery in data processing systems using storage management servers, and, more particularly, to the recovery plan file which contains the recovery plan for a storage management server and the associated data, which would be needed for recovery in the event of a disaster or other loss with respect to the storage management server.

BACKGROUND OF THE INVENTION

Data processing systems typically require storage of large amounts of data, which data is continually being updated, added to, deleted or changed. In major data processing systems, this data is stored by storage management servers in multiple locations, each often remote from each other. The ongoing data processing requires large amounts of data, and such data is typically periodically backed up to prevent loss of the data, by the storage management server. Many businesses view any loss of data as catastrophic, severely impacting the success of the business. To further protect the data of a business, the backed up data is often moved offsite and kept at a site remote from the site of the data processing system and the associated storage management server. Thus, if a disaster strikes the site of the data processing system and the associated storage management server, the data can be recovered from the backup copies located at the remote site.

In a typical major data processing system, a number of "client" data processors are coupled to a single storage management server over a network, and the server receives data files from the clients and stores them on several attached storage devices. The storage management server manages the backup, archiving, and migration of the client files. Clients can vary from small personal computer systems and workstations to large data processing host systems.

In a typical busy data processing system, the data for one or more, or all of the clients, is backed up periodically, and moved to an offsite location, often employing a server-to-server infrastructure to communicate the data to a remote storage management server. Thus, the communicated backup data from one period immediately outmodes that of the previous period, and the server which sent the data needs to have information indicating what was sent at the last communication in order to properly restore the data. Further, the server needs to have information about the clients, the network and about the server itself, in order to be able to carry out the restoration.

In the event of a site disaster, or of loss of the server, the server itself must be restored. Therefore, servers may have a server disaster recovery plan which includes the information, procedures, and executable instructions necessary to recover the storage management server. Currently, the server recovery plan file is manually managed, and copies made on a removable data storage media, such as tape, and for filing or storing, often in a warehouse or other site that is remote from the server site. The previous recovery plan files should be manually deleted, however, they often are part of a load of tapes that are delivered without a certain procedure for expiration and deletion of old tapes. Further, the recovery plan file should be periodically updated so that it tracks, not only changes to the server, but also the changes to the backed up data.

SUMMARY OF THE INVENTION

It is therefore an object of the present invention to provide the capability of saving the storage management server disaster recovery plan file so that it may be easily accessed for recovery of the server.

It is another object of the present invention to provide the capability for management of the saved recovery plan files so that the placement, backup, migration and expiration of recovery plan files is controlled.

Disclosed are a method, a storage management system, an article of manufacture comprising a computer readable medium having computer readable program code embodied therein, and a computer program product for saving a recovery plan file for a storage management server. The storage management system has a plurality of storage management servers at sites remote from one another coupled by a server-to-server infrastructure. A recovery plan file is generated for one of the storage management servers at one of the sites by establishing the one storage management server as a source for the recovery plan file. Another of the storage management servers at a site remote from the source storage management server site is established as a target for the source recovery plan file. The source storage management server creates its recovery plan file. Then, the source storage management server transmits its recovery plan file to the target storage management server at the remote site over the server-to-server infrastructure.

In another aspect of the present invention, the recovery plan file for the source server is managed at the target server according to defined criteria under the control of the source server, such as under specified rules for backup, migration and expiration.

In a further aspect of the present invention, the source recovery plan file is saved to a plurality of target storage management servers at remote sites over the server-to-server infrastructure.

In still another aspect of the present invention, recovery plan files are saved for a hierarchy of storage management servers. The target storage management server is additionally established as a hierarchical source for its recovery plan file. Another of the storage management servers at a site remote from the source site and from the target site is established as a hierarchical target for the hierarchical source recovery plan file. The hierarchical recovery plan file is created by the target. Then, the hierarchical recovery plan file from the target storage management server is transmitted to the hierarchical target storage management server at the remote site over the server-to-server infrastructure.

For a fuller understanding of the present invention, reference should be made to the following detailed description taken in conjunction with the accompanying drawings.

BRIEF DESCRIPTION OF THE DRAWINGS

FIG. 2 is an illustration of a storage medium for storing computer executable instructions;

FIG. 3 is a representation of a recovery plan file for the storage management server of FIG. 1;

FIG. 4 is a diagrammatic illustration of an embodiment of a target and a source storage management servers of FIG. 1 of the present invention;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
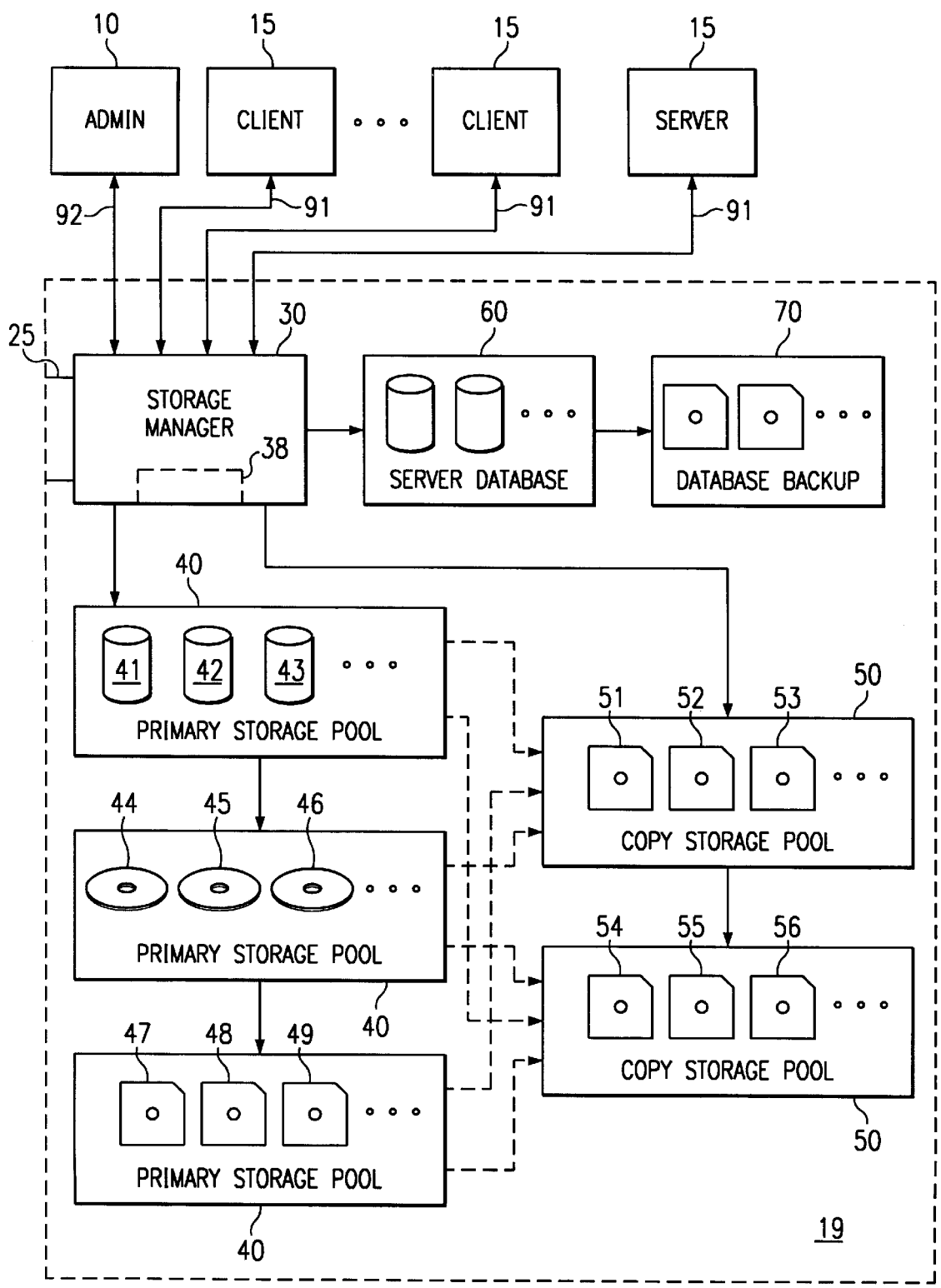
FIG. 1 is a block diagram representation of a storage management server coupled to a plurality of client systems.

Referring to FIG. 1, a storage management server 19 is shown which is coupled to an administrator terminal 10 and to a plurality of client systems 15, which may include other servers. The storage management server includes a storage manager 30 which comprises a computer processor that is operated in accordance with one or more computer program products running on the processor's operating system. One example of a storage manager 30 is the IBM ADSTAR Distributed Storage Manager (ADSM) running on an IBM RS/6000 computer processor. Other examples of storage managers include MVS mainframes, UNIX processors, or Windows NT workstations running with appropriate computer program products. Client systems can vary from small personal computer systems and workstations to large data processing host systems.

Referring to FIGS. 1 and 2, the computer program product (s) may be supplied at I/O station 25 from a storage medium 35 which stores executable computer instructions. The illustrated example of a storage medium which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The computer program product may alternatively be supplied electronically, as from a client network 15. The computer program products and processor operating system may be temporarily stored in memory 38.

Referring to FIG. 1, the server storage manager 30 is coupled to a server database 60 which permanently stores the computer program products and processor operating system. The storage manager is further coupled to a plurality of primary storage pools 40 and a plurality of copy storage pools 50. A storage pool is a named set of storage volumes used to store client data. The devices of the storage pools 40, 50 consists of a plurality of storage devices, either DASD (hard disk drives), optical disk or magnetic tape devices. All storage devices within a single storage pool 40, 50 are identical in type and format. The server database is further coupled to a set of storage volumes 70 providing a backup for the server database 60.

Each client system 15 creates original user data files, or client files, which are stored within the corresponding client system 15. The client systems 15 transfer client files to the storage management server 19. Transferring client files to the storage management server 19 inherently provides a back up mechanism within the server 19 for these original client files. The storage manager 30 directs the client file to a storage device, or storage volume, within a primary storage pool 40. The primary storage pool 40 contains a primary copy of the client files. The storage manager 30 maintains a catalog within the server database 60 listing the files stored within the storage pools 40, 50 of the storage management server 19. Once the client file is stored within a primary storage pool 40, the storage manager 30 updates the server database 60 to catalog this file.

The storage management server 19 also generates an additional backup copy of the client file and stores this backup copy on a storage device, or storage volume, within a copy storage pool 50. The storage manager 30 coordinates this operation. Once the additional backup copy is created within the copy storage pool 50, the storage manager 30 updates the server database 60 to catalog the additional backup copy of the client file. In addition, the catalog entry within the server database corresponding to the additional backup copy includes a cross reference to the primary copy of the client file. Thus, the primary copy in the primary storage pool 40 is linked to the additional backup copy within the copy storage pool 50. Finally, the server database 60 is backed up to a set of storage volumes 70.

Traditionally, disaster recovery comprises physically moving some or all of the copy storage pool volumes 50 and the database backup volumes 70 to an offsite location where it may later be retrieved. More recently, some or all of the storage pool and the database 60 or information relating to the database are electronically transmitted to a remote location. Thus, if the remote location is known, and the server manager 30 and server database are intact, or a new server manager and server database can be implemented, the storage pool information may be electronically returned and the storage pool 40 recreated as of the date of the copy storage pool 50. Alternatively, a new site may be established to which the data storage pool is directed. Thus, the data is protected.

No provision is made in the above for immediate disaster recovery of the storage management server 19 itself. Referring to FIG. 3, a Recovery Plan File 80 may be created which includes the information to recreate the server 19 once the needed hardware is in place. The Recovery Plan File is conventionally created either in printed form or put on removable media and transported to a remote location for storage. Typically, new Recovery Plan Files are created on a periodic basis and similarly transported to the remote location. Also typically, the new Recovery Plan Files are added to the stack at the remote location, and only on occasion are the old files considered expired and removed.

The Recovery Plan File 80 may comprise various "stanzas" (which is a term for related material). One set of stanzas may comprise site specific instructions 81 which include, for example, telephone numbers and names to acquire replacement hardware, and the electrical and other physical requirements for the site. The site specific instructions may be provided on a one time basis and be automatically repeated in each new Recovery File Plan.

Another set of stanzas 82 may relate to the server requirements. Examples include the server itself and the server storage requirements including the quantities of DASD storage space, tape, etc., the types of devices, and a backup volume list for the volumes used to restore the server 19. The server database backup volume names are in the server requirements. The storage manager database contains the pointers to the clients' backed up data as organized by the storage manager 30, policy management, users and administrators, and client nodes.

Configuration file stanzas 83 are related to the storage manager 30 and include, for example, the volume history, the configuration of all of the devices in the server 19 as coupled to the storage manager, and the options that have been supplied with the server and storage manager.

Command stanzas 84 include the executable operating system commands and the storage manager commands that can be used to restore the storage manager.

The Recovery Plan File can be automatically generated by the storage manager 30.

An object of the present invention to provide the capability of saving the Recovery Plan File 80 so that it may be easily accessed for recovery of the storage management server 19.

FIGS. 1 and 4 illustrate an embodiment of a storage management system in accordance with the present invention having a plurality of storage management servers. A storage management server 20 is coupled to the administrator terminal 10 and to a storage management server 90. Each of the storage management servers 20 and 90 are preferably configured as storage management server 19 of FIG. 1. The plurality of storage management servers are located at sites remote from one another coupled by a server-to-server infrastructure 91. The administrator terminal 10 is also coupled to the storage management servers by a similar infrastructure 92. The infrastructure 91 and 92 comprises any suitable digital communication system, and may involve satellites, fiber optic, cable or wire communications media, or any combination.

Figure 5:
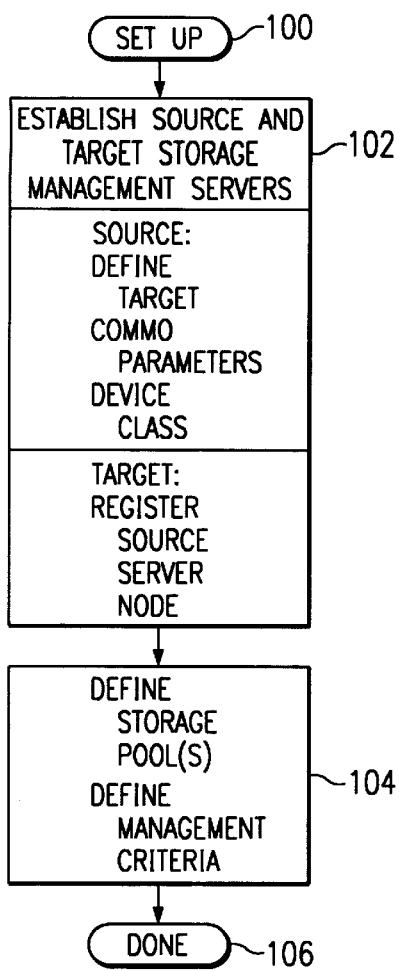
FIG. 5 is a flow chart depicting an embodiment of a method for establishing source and target storage management servers of the present invention.
Figure 6:
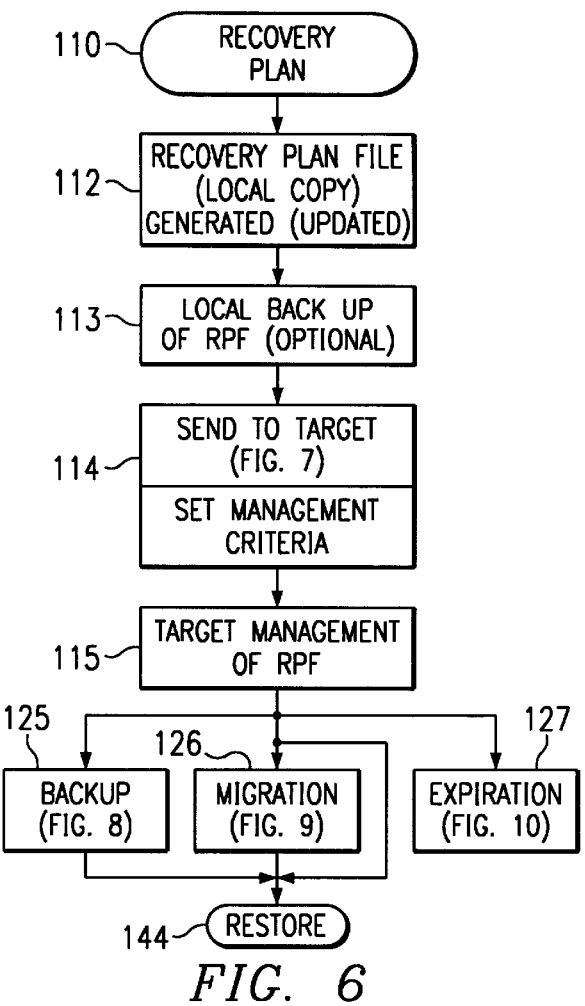
FIG. 6 is a flow chart depicting an embodiment of a method for transmission and management of a recovery plan file of the present invention.
Figure 7:
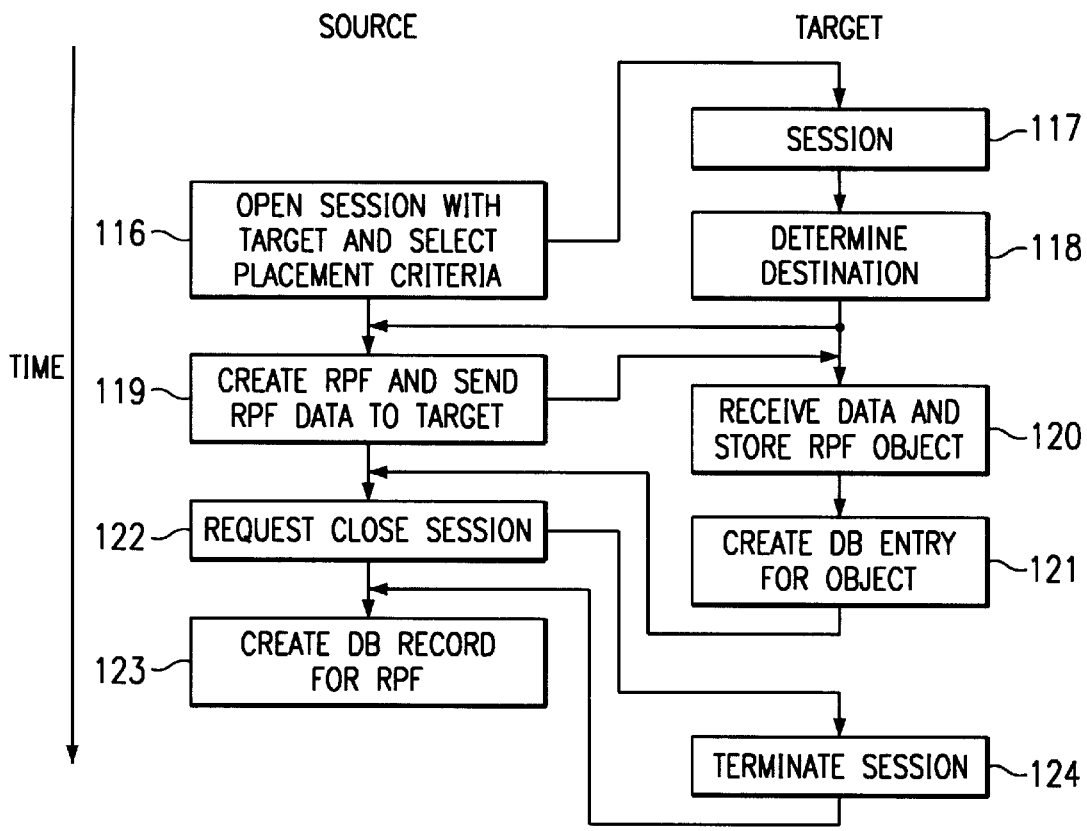
FIG. 7 is a time line flowchart depicting the transmission of a recovery plan file from a source to a target of FIG. 6.

Referring additionally to FIGS. 5–7, an embodiment of the method for saving a recovery plan file for one of the storage management servers 20 at one of the sites is illustrated. The process of FIG. 5 is to set up 100 the one of the storage management servers whose recovery plan file is to be saved as the "SOURCE" server, and the other storage management server as a "TARGET" server. The source server 20 is registered as a client of the target server. Ideally, the target server is the same server at which the data is backed up for disaster recovery. The administrator terminal 10 is registered as a client of both the source server 20 and target server 90. In step 102, the administrator at terminal 10 identifies (in a command or commands) the one storage management server 20 as a source for the recovery plan file, and identifies another of the storage management servers 90 at a site remote from the source storage management server site as a target for the source recovery plan file. The computer readable program code carries out the commands and establishes the respective storage management servers as the source and the target. In one example, at the source storage management server 20, the target storage management server 90 is defined as a receiving device for the source storage management server. The server definition includes providing the communication attributes, node and password information for connecting to the target server 90.

The source server node 20 is registered on the target 90.

In step 104, the administrator defines the storage pool requirements for the source recovery plan file.

Additionally, the placement for the source recovery plan file at the target storage management server is defined, for example, by associating the recovery plan file with a management class.

Other aspects of the management criteria for the recovery plan file can be established in step 104 of the process of FIG. 5. Additional criteria include the backup, migration, and expiration of the recovery plan file. For example, the backup criteria is established for the recovery plan file, as is the migration criteria, by the source server associating the plan with a target server criteria. Expiration policy is established for the recovery plan file object by the source server, in accordance with the present invention.

The set up process of FIG. 5 may be conducted entirely before transfer of the recovery plan file as is shown, or may alternatively be conducted partially during the transfer.

The set up process is then completed 106.

Referring additionally to FIG. 6, the process for saving the recovery plan file is initiated at step 110. First, in step 112, the recovery plan file is generated (or updated) locally for the source storage management server 20, substantially as discussed above. Additionally, as part of the initiation of generating the recovery plan file, the administrator states where the backed up recovery plan file is to be stored, namely, at the target storage management server 90. The organization of target storage management server 90 is identical to that of storage management server 20 in FIG. 1, and the description thereof is employed herein as the description of server 90.

Optionally, in step 113, the local recovery plan file may be backed up by the server 20. Once the file has been transferred for the purpose of disaster recovery, there is no disaster recovery need to maintain either the original or backup copies in the server 20. However, for ease of creating the next recovery plan file by updating the previous file, the user may wish to keep either the original or the backup copy.

In step 114, the source storage management server 20 transfers its recovery plan file to the target storage management server 90, and sets or specifies the management criteria for its recovery plan file in accordance with the criteria defined in step 104 of FIG. 5, which is stored in the target server database 60.

In step 115, the target server conducts the storage and management of the source recovery plan file in accordance with the criteria set in step 114.

The target server 90 has thus saved the source storage management server disaster recovery plan file so that it may be easily accessed by the target server 90 for recovery of the source server 20.

FIG. 7 illustrates an embodiment of the interaction between the source server 20 and the target server 90 during step 114 of FIG. 6, providing a rough time line for the processes.

Steps 116, 117 and 118 are conducted first. The source server 20 opens a session with the target server 90 in step 116, and the target 90 responds by granting the session to its client. Also in step 116, the source server 20 specifies the management criteria (which may have been established previously in step 104 of FIG. 5) and communicates the management criteria, which includes the desired location of the file. In step 118, the target server 90 determines the destination of the file in the target server 90, in accordance with the definitions of the storage pool(s) and location or management class provided by the source server 20. For example, the destination may be a predefined storage pool "BRANCH OFFICES".

Next, steps 119, 120 and 121 are conducted. The source server 20 reads the local copy of the recovery plan file in step 119 and sends the file to the target server 90. The data sent in step 119 may also include information regarding the server database 60 and the storage pool 40. In step 120, the target server 90 receives the data and stores the object, which includes the file, in the storage pool and at the destination determined in step 118. In step 121, the target server 90 creates an entry for the object in its database 60 and reports the receipt of the object to the source server 20.

The source server 20 then requests closure of the session with the target server 90 in step 122, and, in step 123, creates a record in its database 60 for the transferred recovery plan file. The target server 90 then terminates the session in step 124. The local copy of the file and any local backup copy may then be deleted.

Referring to FIG. 6, the target server 90, in step 115, conducts management of the recovery plan file. The management includes backup of the file in step 125, migration of the file in step 126, and expiration in step 127. Each of the steps 125–127 is described in greater detail in FIGS. 8–10, respectively.

Figure 8:
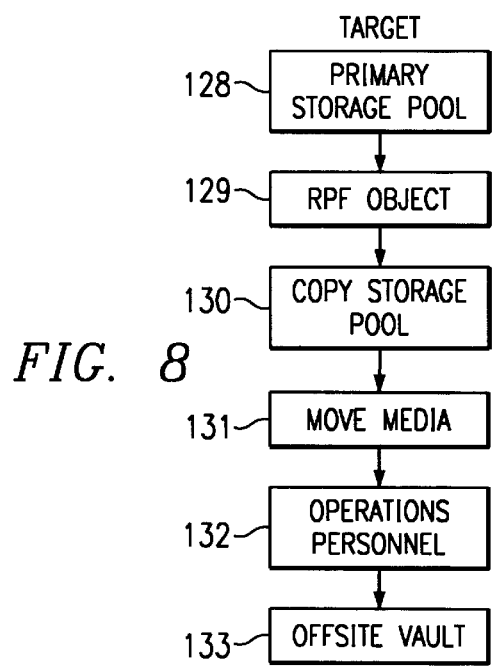
FIG. 8 is a flowchart depicting the management of the backup of the source recovery plan file by the target.

The target server backup process of step 125 is illustrated in FIG. 8. As shown in step 128, the recovery plan file is initially located in a primary storage pool 40. It is up to the customer to identify the data to be backed up, and the data to be backed up is placed in storage pools 40 that are then designated for backup. The source server has indicated in step 116 that the recovery plan file is an object 129 that is placed in a specific storage pool. This storage pool can then be backed up. First, in step 130, the recovery plan file object in the primary storage pool is copied onto a removable media, such as tape in an automated data storage library, and, in step 131, the media can be removed from the library. In step 132, operations personnel physically move the media to an off site vault 133 for safekeeping. Should the primary storage pool 40 be lost, such as by a disk crash, the copy may be retrieved from the off site vault.

Figure 9:
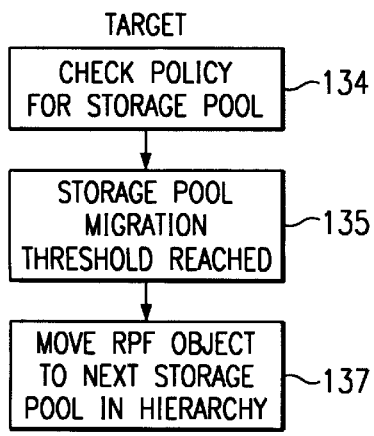
FIG. 9 is a flowchart depicting the management of the migration of the source recovery plan file by the target.

The target server migration process of step 126 is illustrated in FIG. 9. In step 134, the target server 90 periodically checks the migration threshold for the primary storage pool, and, if step 135 indicates that the storage pool volume has become sufficiently full that the threshold (e.g., 95%) of step 134 has been reached, the object is moved to the next storage pool in the hierarchy in step 137. For example, in step 137, the object is copied to the next storage pool and is deleted from the primary storage pool. The migration may be repeated down the hierarchy.

Figure 10:
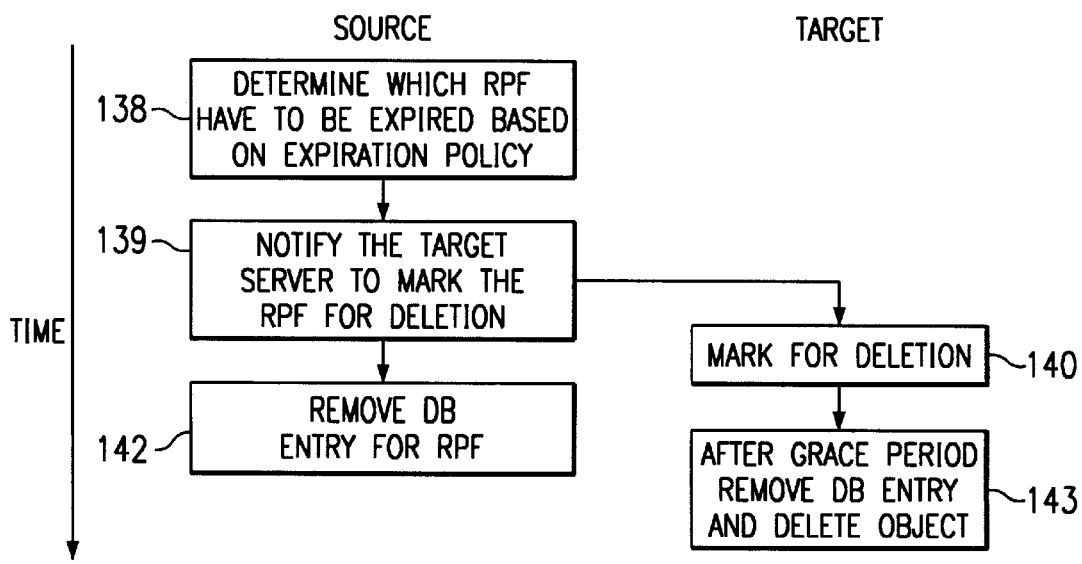
FIG. 10 is a flowchart depicting the management of the expiration and deletion of the source recovery plan file at the target.

The expiration and deletion process 127 is illustrated in FIG. 10. The process is controlled by the source server 20 and is carried out by the target server 90. Preferably, the administrator 10 of the source server 20 sets the expiration policy for all recovery plan files from that server. For example, the expiration may be set at a period of 90 days from the creation of the original file at the source server.

The step 127 management of the storage pool(s) includes looking up the expiration policy therefor in the database 60 of the source server 20 by the storage manager 30. Only the recovery plan file that is indicated in step 138 as expiring now will be marked for deletion under the control of the source server in step 139, and specifically marked for deletion by the target server in step 140. Thus, if the saved source recovery plan file is not due for expiration, it remains in place, and the step 138 is periodically repeated.

Upon marking the recovery plan file for deletion, the source server, in step 142, removes its database entry for the file.

The object is not immediately deleted. Rather, a grace period is provided, such as 10 additional days, in step 143. If the recovery plan file has met the grace period, the target server 90 deletes the object.

Referring to FIG. 6, should restoration of the source server be required, the recovery plan file for the source server may be easily recovered in step 144 from the original copy before migration, from the migrated copy of step 126 or, if the migrated copy is lost (unlikely), then from the backup copy of step 125.

Thus, the source storage management server disaster recovery plan file has been saved so that it may be easily accessed for recovery of the server, and the saved source recovery plan file is managed so that the expiration of older recovery plan files is controlled.

Those of skill in the art appreciate that the above described operations may be modified without departing from the spirit and scope of the present invention.

Figure 11:
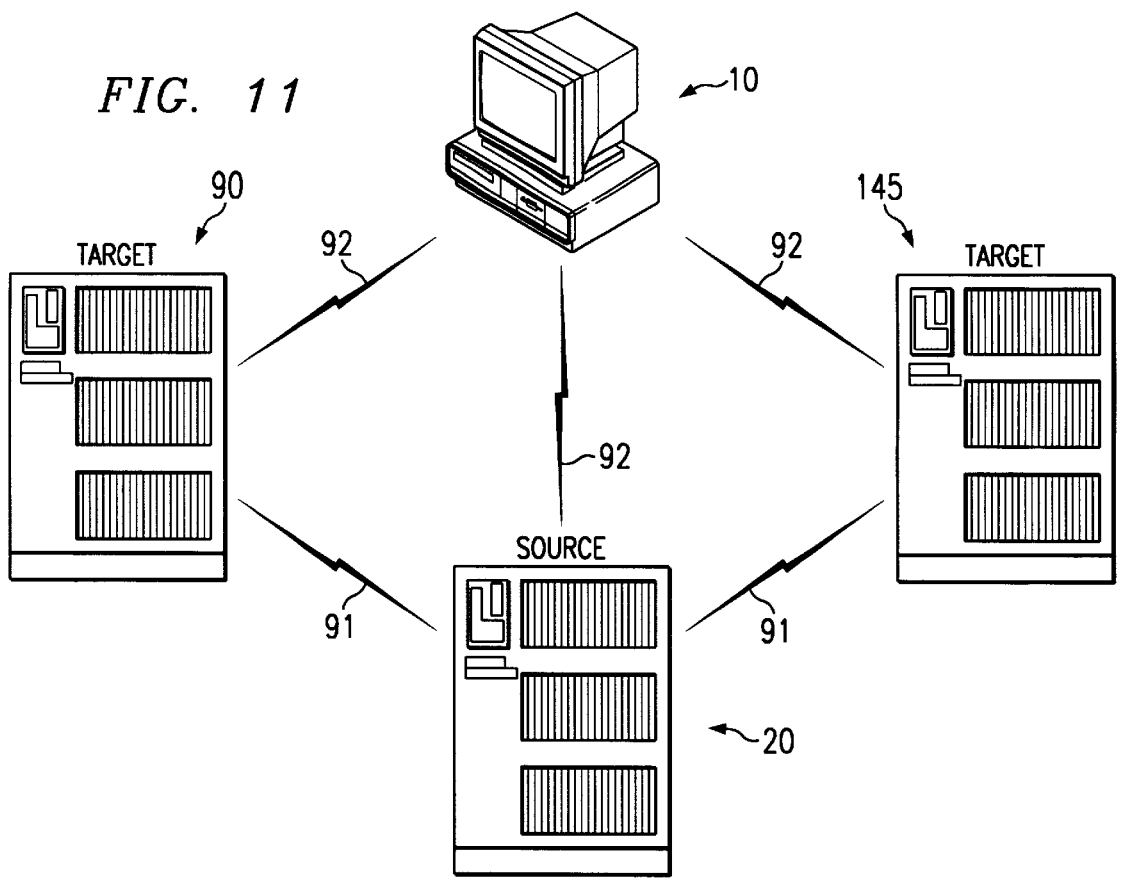
FIG. 11 is a diagrammatic illustration of an embodiment of a single source and multiple target storage management servers of the present invention.

FIG. 11 illustrates an embodiment of a single source storage management server 20 and multiple target storage management servers 90 and 145 of the present invention. Each of the servers 20, 90 and 145 is preferably configured as storage management server 19 of FIG. 1.

The source and target servers are coupled by means of the server-to-server infrastructure 91 and the administrator terminal 10 is also coupled to the storage management servers by the similar infrastructure 92.

Employing the same process as defined in FIGS. 5 and 6, a plurality of storage management servers 90, 145 at sites remote from the source storage management server site are established as targets for the source recovery plan file. The transmitting step 122 comprises transmitting the source recovery plan file from the source server 20 to the plurality of target storage management servers over the server-to-server infrastructure 92. The source recovery plan file is therefore saved at both of the target storage management servers, to better assure the availability of the file when needed.

Figure 12:
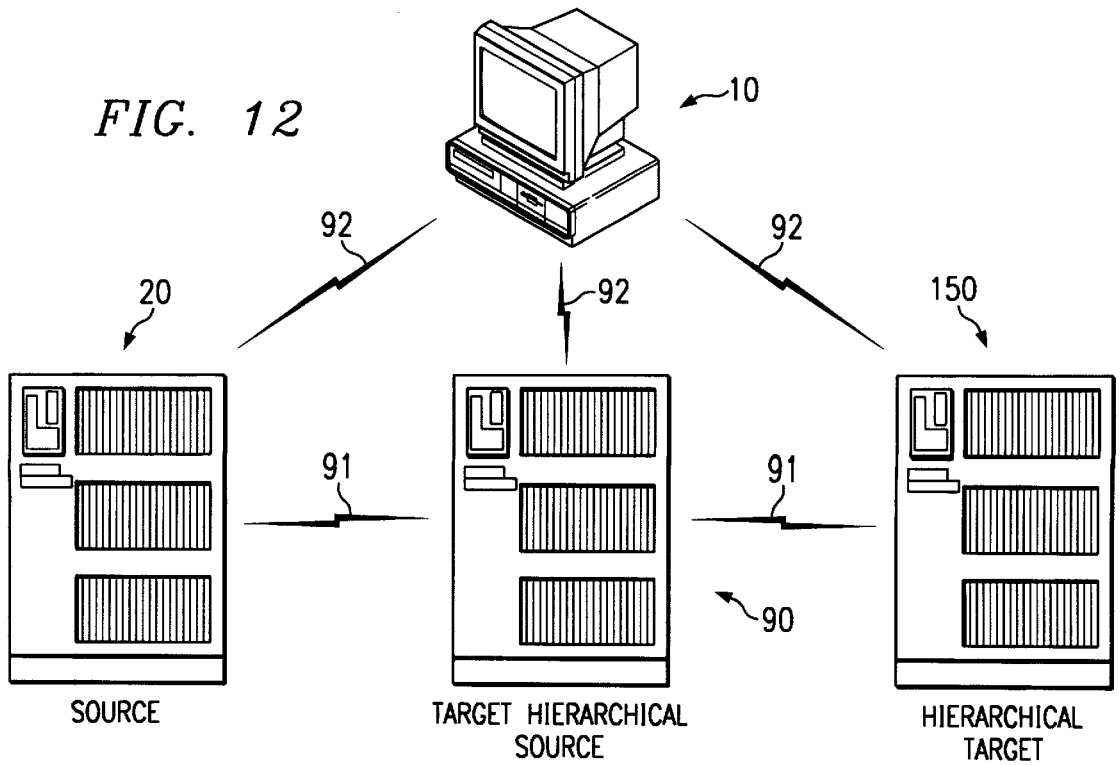
FIG. 12 is a diagrammatic illustration of an embodiment of an hierarchical source and target arrangement of storage management servers of the present invention.

FIG. 12 illustrates an embodiment of an hierarchical source and target arrangement of storage management servers of the present invention. Specifically, the source recovery plan file from source storage management server 20 is saved by the target storage manager 30 of the target storage management server 90, which comprises a server at the next level in the hierarchy. The target storage management server is established by administrator 10 and the storage managers as its hierarchical source for the recovery plan file. The storage management system additionally comprises a hierarchical target storage manager 30 at a hierarchical target storage management server 150 at a site remote from the source storage management server site and from the target storage management server site. The hierarchical target server 150 comprises another level in the hierarchy. The target storage manager 30 of the target and hierarchical source server 90 operates the target and hierarchical source storage management server 90 to transmit the source recovery plan file along the herarchy from the target storage management server to the hierarchical target storage management server 150 at the remote site over the server-to-server infrastructure. The target server 90 may, for example, be at a regional headquarters of the source server 20, and the hierarchical target server 150 may, for example, be at a national headquarters. The set up of the servers, generation and transmission of each of the recovery plan files, and saving and management of the recovery plan files are conducted in accordance with the processes of FIGS. 5 and 6. Thus, the source storage management server disaster recovery plan file has been saved so that it may be easily accessed for recovery of the server 20, and the saved source recovery plan file is managed so that the expiration of older recovery plan files is controlled.

Those of skill in the art will recognize that servers 20, 90, 145 and 150 may be identical or may comprise different processors and storage devices, and operate under different operating systems. The storage pools and the communications must allow transfer of the recovery plan files between the servers, and must allow use of computer readable program code in accordance with the present invention, employing a configuration similar to that of storage management server 19 of FIG. 1.

Those of skill in the art will also recognize that other similar multiple or hierarchical arrangements of servers may be envisioned without departing from the scope of the present invention.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a storage management system having a plurality of storage management servers at sites remote from one another coupled by a server-to-server infrastructure, a method for saving a recovery plan file for one of said storage management servers comprising the steps of:

establishing one of said storage management servers at one of said sites as a source for said recovery plan file therefor, and establishing another of said storage management servers at a site remote from said source storage management server site as a target for said source recovery plan file;

generating said source recovery plan file; and transferring said source recovery plan file from said source storage management server to said target storage management server at said remote site over said server-to-server infrastructure, thereby saving said source recovery plan file at said target storage management server.

2. The method for saving a recovery plan file of claim 1, comprising the additional step of managing said source recovery plan file at said target storage management server according to defined criteria.

3. The method for saving a recovery plan file of claim 1, wherein said establishing step comprises establishing a plurality of other of said storage management servers at sites remote from said source storage management server site as targets for said source recovery plan file, and wherein said transferring step comprises transferring said source recovery plan file to said plurality of target storage management servers at said remote sites over said server-to-server infrastructure.

4. The method for saving a recovery plan file of claim 1 for saving recovery plan files along a hierarchy of storage management servers, wherein said method comprises the additional steps of:

establishing said target storage management server as a hierarchical source for said source recovery plan file and another of said storage management servers at a site remote from said source storage management server site and from said target storage management server as a hierarchical target for said source recovery plan file; and transmitting said source recovery plan file from said target storage management server to said hierarchical target storage management server at said remote site over said server-to-server infrastructure.

5. The method for saving a recovery plan file of claim 2, wherein said establishing step additionally comprises defining backup, migration and expiration of said source recovery plan file, thereby defining said criteria.

6. The method for saving a recovery plan file of claim 2, wherein said establishing step additionally comprises defining storage pool requirements for said source recovery plan file.

7. The method for saving a recovery plan file of claim 5, wherein said source recovery plan file is defined to expire under an expiration rule at said source storage management server, and wherein said managing step deletes said source recovery plan at said target storage management server under the control of said source storage management server.

8. A storage management system comprising:

a plurality of storage management servers at sites remote from one another;

a server-to-server infrastructure coupling said plurality of storage management servers to each other;

a source storage manager at one of said plurality of said storage management servers establishing said one storage management server as a source storage management server, generating a source recovery plan file, and operating said source storage management server to transfer said source recovery plan file to a target storage management server at a site remote from said source storage management server site over said server-to-server infrastructure, thereby saving said source recovery plan file at said target storage management server.

9. The storage management system of claim 8, additionally comprising an administrator terminal, defined as a client to each of said source storage management server and said target storage management server, said administrator terminal allowing an operator to select said storage management servers as said source and said target, respectively.

10. The storage management system of claim 8, wherein said target storage manager at said target storage management server additionally establishes said target storage management server as a hierarchical source for said source recovery plan file, and said storage management system additionally comprises a hierarchical target storage manager of a hierarchical target storage management server at a site remote from said source storage management server site and from said target storage management server site, and wherein said target storage manager operates said target storage management server to transmit said source recovery plan file from said target storage management server to said hierarchical target storage management server at said remote site over said server-to-server infrastructure.

11. The storage management system of claim 8, wherein said source storage manager at said source storage management server additionally operates said source storage management server to transfer said source recovery plan file to a plurality of target storage management servers at said remote sites over said server-to-server infrastructure.

12. The storage management system of claim 9, wherein said source recovery plan file is managed at said target storage management server according to defined criteria under the control of said source storage manager.

13. The storage management system of claim 12, wherein said source storage manager additionally defines backup, migration and expiration of said source recovery plan file, thereby defining criteria for management of said source recovery plan file at said target storage management server.

14. The storage management system of claim 12, wherein said source storage manager additionally defines storage pool requirements for said source recovery plan file at said target storage management server.

15. An article of manufacture comprising a computer readable medium having computer readable program code embodied therein for saving a recovery plan file for one of a plurality of storage management servers at sites remote from one another coupled by a server-to-server infrastructure, comprising:

computer readable program code which causes a computer processor of one of said storage management servers at one of said sites to establish said one storage management server as a source for said recovery plan file therefor, and identify at said source storage management server another of said storage management servers at a site remote from said source storage management server site as a target for said source recovery plan file;

computer readable program code which causes said computer processor to generate said source recovery plan file; and computer readable program code which causes said computer processor to transfer said source recovery plan file from said source storage management server to said target storage management server at said remote site over said server-to-server infrastructure, thereby saving said source recovery plan file at said target storage management server.

16. The article of manufacture of claim 15, wherein said computer readable program code which causes said computer processor to establish said source and said target storage management servers additionally causes said computer processor to define backup, migration and expiration of said source recovery plan file, thereby defining criteria for management of said source recovery plan file by said target storage manager.

17. The article of manufacture of claim 15, wherein said computer readable program code which causes said computer processor to establish said source and said target storage management servers additionally causes said computer processor to define storage pool requirements for said source recovery plan file at said target storage management server.

18. The article of manufacture of claim 15, wherein said computer readable program code which causes said computer processor to establish said source and said target storage management servers additionally causes said computer processor to establish a plurality of other of said storage management servers at sites remote from said source storage management server site as targets for said source recovery plan file, and to transfer said source recovery plan file to said plurality of target storage management servers at said remote sites over said server-to-server infrastructure.

19. The article of manufacture of claim 16, additionally comprising computer readable program code which causes said computer processor to define said source recovery plan file as expiring under an expiration rule at said source storage management server, thereby defining criteria which expires said source recovery plan file at said target storage management server under the control of said source storage management server.

20. A computer program product stored on a computer readable medium usable with a programmable computer, said computer program product having computer readable program code embodied therein for saving a recovery plan file for one of a plurality of storage management servers at sites remote from one another coupled by a server-to-server infrastructure, comprising:

computer readable program code which causes a computer processor of one of said storage management servers at one of said sites to establish said one storage management server as a source for said recovery plan file therefor, and identify at said source storage management server another of said storage management servers at a site remote from said source storage management server site as a target for said source recovery plan file;

computer readable program code which causes said computer processor to generate said source recovery plan file; and computer readable program code which causes said computer processor to transfer said source recovery plan file from said source storage management server to said target storage management server at said remote site over said server-to-server infrastructure, thereby saving said source recovery plan file at said target storage management server.

21. The computer program product of claim 20, wherein said computer readable program code which causes said computer processor to establish said source and said target storage management servers additionally causes said computer processor to define backup, migration and expiration of said source recovery plan file, thereby defining criteria for management of said source recovery plan file by said target storage manager.

22. The computer program product of claim 20, wherein said computer readable program code which causes said computer processor to establish said source and said target storage management servers additionally causes said computer processor to define storage pool requirements for said source recovery plan file at said target storage management server.

23. The computer program product of claim 20, wherein said computer readable program code which causes said computer processor to establish said source and said target storage management servers additionally causes said computer processor to establish a plurality of other of said storage management servers at sites remote from said source storage management server site as targets for said source recovery plan file, and to transfer said source recovery plan file to said plurality of target storage management servers at said remote sites over said server-to-server infrastructure.

24. The computer program product of claim 21, additionally comprising computer readable program code which causes said computer processor to define said source recovery plan file as expiring under an expiration rule at said source storage management server, thereby defining criteria which expires said source recovery plan file at said target storage management server under the control of said source storage management server.

* * * * *

UNITED STATES PATENT AND TRADEMARK OFFICE
CERTIFICATE OF CORRECTION

| | |
|---|---|
| PATENT NO. | : 6,266,784 B1 |
| APPLICATION NO. | : 09/153595 |
| DATED | : July 24, 2001 |
| INVENTOR(S) | : Yu-Mei Una Hsiao et al. |

It is certified that error appears in the above-identified patent and that said Letters Patent is hereby corrected as shown below:

On the Title Page, Item (75): "Rosa Tesiler Plaza" should read --Rosa Tesller Plaza--

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,266,784 B1 | Page 1 of 1 |
| APPLICATION NO. | : 09/153595 | |
| DATED | : July 24, 2001 | |
| INVENTOR(S) | : Yu-Mei Una Hsiao et al. | |

It is certified that error appears in the above-identified patent and that said Letters Patent is hereby corrected as shown below:

On the Title Page, Item (75): "Rosa Tesiler Plaza" should read --Rosa Tesller Plaza--

Signed and Sealed this

Eighth Day of May, 2007

JON W. DUDAS
*Director of the United States Patent and Trademark Office*